April 27, 1954  D. V. SARBACH  2,676,636
HOLLOW LINED ARTICLE AND METHOD OF MAKING SAME
Filed June 18, 1949
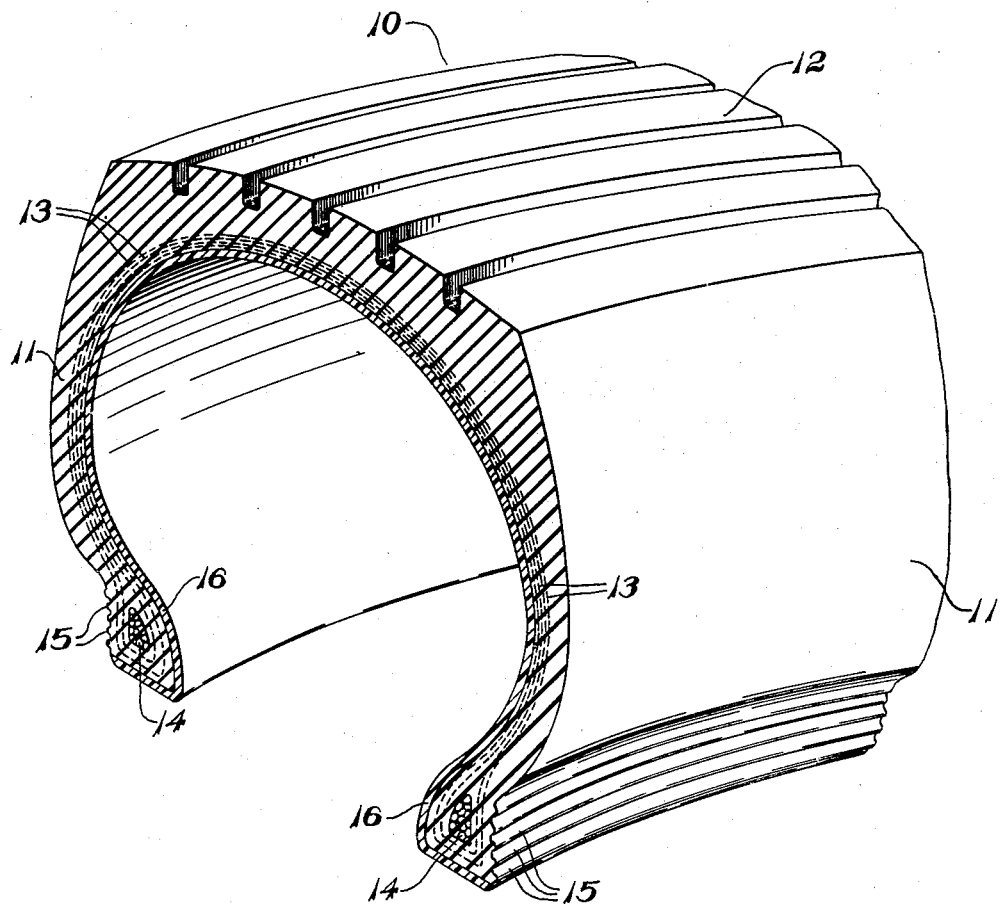
Inventor
Donald V. Sarbach
By Robert W. Furlong
Atty.

Patented Apr. 27, 1954

2,676,636

UNITED STATES PATENT OFFICE 2,676,636

HOLLOW LINED ARTICLE AND METHOD OF MAKING SAME

Donald V. Sarbach, Cuyahoga Falls, Ohio, assignor to The B. F. Goodrich Company, New York, N. Y., a corporation of New York Application June 18, 1949, Serial No. 100,044

19 Claims. (Cl. 152—330)

This invention relates to hollow rubbery articles having a liner that is impermeable to air and pertains more particularly to a rubbery air-impermeable liner composition for such articles.

It is an object of my invention to provide an improved liner element for hollow rubbery articles such as pneumatic tires and the like.

Another object of my invention is to provide an air-impermeable liner element for a hollow rubbery article which adheres directly to the body of the article after vulcanization without the use of a tie gum or cement.

Another object of my invention is to provide a rubbery liner composition which is highly resistant to the diffusion of air and which is directly adherent to the inner face of the rubbery carcass of a pneumatic tire.

A further object of my invention is to provide an air-impermeable liner element which has excellent chafing resistance.

Another object of my invention is to provide an air-impermeable liner element which need not be reinforced with carbon black and, therefore, is capable of being produced in various colors.

Still another object is to provide a simple and inexpensive lined rubbery article which is easily assembled.

Other objects will be apparent from the drawing and description which follow.

The rubbery materials commonly employed for the manufacture of rubbery articles are permeable to air, so that in the case of hollow inflated articles diffusion and subsequent loss of pressure occur. This unsatisfactory condition has been greatly improved by placing a liner made of an air-impermeable material in such articles. The air-impermeable liner is generally comprised of a rubbery copolymer of a major proportion of an isoolefin having from four to seven carbon atoms with a minor proportion of an open-chain aliphatic conjugated diolefin having from four to eight carbon atoms, commonly known as "Butyl" rubber. Many problems are presented by use of such a liner, however, the most important being that due to the inherent nature of the aforementioned rubbery copolymer not to adhere to other rubbery materials, adhesion of the liner to the rubbery body of the article has been unsatisfactory. Various tie gums and adhesives have been used to adhere the liner to the body of the article; however they have not proven to be entirely satisfactory and many manufacturing difficulties have arisen in the assembly of the article. Conventional "Butyl" liner elements also present a difficult chafing problem, in that these liners are very susceptible to frictional deterioration. The conventional "Butyl" compositions employed in air-impermeable liners require reinforcement with carbon black to impart to the liners desired physical properties due to the inherent nature of "Butyl" rubber not to be satisfactorily reinforced by other rubber compounding materials, and for this reason the liner compositions are black. This is a serious disadvantage in articles requiring an air-impermeable liner member of a color other than black.

I have discovered a liner composition which comprises a blend of a sulfur-vulcanizable elastomeric material with a partially-refined pre-cured rubbery copolymer of a major proportion of an isoolefin having from four to seven carbon atoms with a minor proportion of an open-chain aliphatic conjugated diolefin having from four to eight carbon atoms. A liner of such composition provides excellent resistance to air diffusion and may be directly bonded to the rubbery body of the article merely by vulcanizing the liner in contact with the rubbery body portion, thereby eliminating the necessity of using a tie gum or adhesive in adhering the liner to the rubbery body. Furthermore, a liner embodying my invention has excellent resistance to chafing and may be manufactured in numerous colors.

In the drawing and description which follow a pneumatic tubeless tire embodying my invention is used only as an illustration. I do not intend to limit my invention to tires, but contemplate its use in other types of inflatable rubbery articles.

In the drawing, the figure is a view in perspective of a tire constructed in accordance with and embodying the invention.

The tire comprises a carcass 10 constructed of a natural or synthetic rubbery material having sidewall portions 11, 11 and a tread portion 12 encircling the carcass 10. The carcass 10 is composed of plies 13, 13 of textile cord coated or impregnated with rubbery material which give the tire strength. The number of plies used is determined by the size and the purpose for which the tire is intended. Beads 14, 14 prevent stretching of the tire when in service and hold the tire securely onto the metal wheel rim. Sealing ribs 15, 15 bear against the wheel rim and provide a sealing means preventing air from escaping from the inner chamber of the tire. Disposed over the extent of the inner face of the carcass 10 from bead portion to bead portion and vulcanized thereto is an air-impermeable rubbery liner 16.

It is preferable that the elastomeric material of the carcass 10 be either natural rubber, which is essentially a rubbery polymer of isoprene, such as caoutchouc and the like, or a rubbery copolymer of butadiene-1,3 and styrene, particularly those polymers copolymerized with from 65 to 80 parts of butadiene and 20 to 35 parts of styrene, or a blend of the two, since these rubbery materials exhibit the most satisfactory hysteresis properties.

Typical examples of rubbery compositions which may be used in the carcass are as follows.

EXAMPLE 1

A typical example of a carcass composition using natural rubber as the elastomeric material is as follows:

| Material: | Parts by weight |
|---|---|
| Natural rubber | 100.0 |
| Sulfur | 3.0 |
| Zinc oxide | 5.0 |
| Carbon black | 30.0 |
| Fatty acid | 1.0 |
| Accelerator | 0.7 |
| Softener | 12.0 |
| Total | 151.7 |

EXAMPLE 2

A typical example of a carcass composition using a rubbery butadiene-styrene copolymer as the elastomeric material is as follows:

| Material: | Parts by weight |
|---|---|
| Rubbery butadiene-styrene copolymer (GR–S) (72% conversion) | 100.0 |
| Carbon black | 30.0 |
| Zinc oxide | 4.0 |
| Accelerator | 0.9 |
| Softener | 9.0 |
| Sulfur | 3.2 |
| Antioxidant | 1.1 |
| Total | 148.2 |

EXAMPLE 3

A typical example of a carcass composition using a blend of natural rubber and a rubbery butadiene-styrene copolymer as the elastomeric material is as follows:

| Material: | Parts by weight |
|---|---|
| Natural rubber | 75.0 |
| Rubbery butadiene-styrene copolymer (GR–S) (72% conversion) | 25.0 |
| Zinc oxide | 4.0 |
| Sulfur | 3.5 |
| Accelerator | 0.8 |
| Antioxidant | 0.9 |
| Softener | 9.5 |
| Fatty acid | 0.5 |
| Carbon black | 30.0 |
| Total | 149.2 |

These compositions may be prepared in the usual manner on a roll mill or in an internal mixer.

The composition from which the air-impermeable rubbery liner is constructed comprises a homogeneous mixture of from 20 to 50 percent by weight based on the total weight of elastomeric material in the composition of a sulfur-vulcanizable polymeric organic rubbery material and from 50 to 80 percent by weight based on the total weight of elastomeric material in the composition of a rubbery copolymer of a major proportion of an isoolefin having from four to seven carbon atoms with a minor proportion of an open-chain aliphatic conjugated diolefin having from four to eight carbon atoms which copolymers are commercially referred to as "Butyl" rubbers, such copolymer having been vulcanized and subsequently partially refined prior to blending into the mixture.

"Butyl" rubber is that class of rubbery isoolefin-diolefin copolymers commonly prepared by a low temperature copolymerization process of a major proportion of an isoolefin and a minor proportion of an open-chain conjugated diolefin. It is preferable to use isobutylene as the isoolefin and isoprene as the diolefin, and preferably the copolymer comprises from 80 to 99½ parts by weight of an isomonoolefin, such as ethyl methyl ethylene or isobutylene, copolymerized with from ½ to 20 parts by weight of an open-chain conjugated diolefin, such as isoprene, butadiene-1,3; 1,2-dimethyl butadiene-1,3 (or 3-methyl pentadiene-1,3); 2,3-dimethyl butadiene-1,3; 1-ethyl butadiene-1,3 (or hexadiene-1,3); 1,3-dimethyl butadiene-1,3; 1,4-dimethyl butadiene-1,3 (or hexadiene-2,4); and the like. "GR–I," "Butyl A," "Butyl B," "Butyl C," and "Flexon" are names commonly applied by the trade to rubbers in this class of synthetic rubbers. In the description of my invention reference to "Butyl" rubber refers to the above-mentioned class of "man-made" rubbers.

The "Butyl" rubber used in the liner of this invention is first vulcanized in a conventional manner with sulfur and any other suitable compounding ingredients conventionally used, such as accelerators, antioxidants, pigments, fillers and the like. However, since unrefined vulcanized "Butyl" rubber cannot be satisfactorily blended with a vulcanizable natural or synthetic rubber it is partially refined on a roll mill or in an internal mixer prior to blending. To obtain the most satisfactory liner the vulcanized "Butyl" rubber should be refined until it has adhesive properties equivalent to those obtained by refining the "Butyl" composition in the absence of softeners until it forms loose friable agglomerates that do not form a continuous plastic sheet of material. If the vulcanized "Butyl" rubber is fully refined or reclaimed and is blended in this condition with a vulcanizable natural or synthetic rubber, the resulting composition will adhere poorly to the body of the article, when the two are vulcanized together. Mechanical mastication alone has proven a very satisfactory method of refining vulcanized "Butyl" rubber.

It is preferable that the vulcanized "Butyl" composition prior to the refining process be treated with a volatile swelling agent, such as dipentene, kerosene, turpentine, p-cymene, tetrahydronaphthalene, chlorobenzene, etc., which reduces the tendency of the composition to become fully reclaimed in the refining process, and also reduces the quantity of frictional heat developed in refining the composition.

The vulcanizable polymeric organic rubbery material which is blended with a major proportion of the "Butyl" rubber composition (that has been vulcanized and partially refined as described above) may be either natural rubber which is essentially a polymer of isoprene, such as caoutchouc and the like, or synthetic rubber, such as the rubbery polymers of open-chain conjugated diolefins having from four to eight carbon atoms exemplified by butadiene-1,3; isoprene; 2,3-dimethyl butadiene-1,3; 1,4-dimethyl butadiene-1,3 and the like, or the copolymers of these and similar materials with each other or with such copolymerizable monomeric materials as styrene, acrylonitrile, isobutylene, methyl acrylate, methyl methacrylate, ethyl methacrylate, ethyl acrylate, 2-vinyl pyridine, and similar materials, or the rubbery polymers of 2-chloro-1,3 butadiene and the like.

It is preferable that the same vulcanizable polymeric organic rubbery material incorporated in the body portion of the article to which the liner is to be vulcanized be used as the elastomeric material which is blended with the "Butyl" rubber composition to form the liner composition. A liner prepared in the above-mentioned manner and vulcanized in contact with the adjacent rubbery body portion of the article has an excellent adhesive bond to such body portion and is highly impermeable to air. Such a liner is readily assembled with the body portion and does not require the use of a tie gum or adhesive material to obtain the desired adhesion, but bonds directly to the body portion merely by vulcanizing the assembled liner and body portion together.

Any of the ingredients commonly employed in the industry for compounding rubbery materials which include reinforcing agents, fillers, softeners, oils, vulcanizing agents, accelerators and antioxidants may be incorporated into the liner or body portion, and they may be employed in any usual combination and proportion.

The following is a typical example of a "Butyl" composition which may be employed in my invention, however it is cited merely as an illustration and it must be understood that I do not intend to limit the scope of my invention to this composition.

| Material: | Parts by weight |
|---|---|
| Isobutylene-isoprene rubber (97:3 copolymer) | 100.0 |
| Carbon black | 60.0 |
| Zinc oxide | 5.0 |
| 2,2'-benzothiazyl disulfide | 0.6 |
| Sulfur | 2.0 |
| Tetraethyl thiuram disulfide | 1.0 |
| Total | 168.6 |

This composition may be mixed and vulcanized in any conventional manner, such as mixing the ingredients on a roll mill and heating the mixed material at 310° F. for a period of 10 minutes.

The resulting vulcanized "Butyl" composition is partially refined preferably by mechanical mastication, although heat degradation or other rubber refining processes may be employed, until the composition forms a friable material which is not in a fully reclaimed state. A typical mechanical refining process consists of grinding the vulcanized "Butyl" composition and passing the ground material through a tight mill (a clearance between the mill roll of 0.007" is satisfactory) or through a refiner mill until the desired degree of refinement is obtained.

The vulcanizable polymeric organic material which is to be blended with the partially refined "Butyl" composition is, as heretofore mentioned, preferably the same elastomeric material as is used in the carcass portion of the tire to which the liner is to be vulcanized. For example, if natural rubber is to be used in the body portion which will be adjacent to the liner in the finished article, natural rubber is preferably used to blend with the partially refined "Butyl" composition to form the liner composition.

Examples of rubbery compositions which may be blended with the precured partially refined "Butyl" composition to form a liner composition are illustrated by the following recipes and are included merely for purposes of illustration and are not intended to limit the scope of this invention.

EXAMPLE 1

A typical example of a rubbery composition which may be blended with a pre-cured partially refined "Butyl" composition to form a liner composition and using natural rubber as the elastomeric material is as follows:

| Material: | Parts by weight |
|---|---|
| Natural rubber | 100.0 |
| Whiting | 50.0 |
| Carbon black | 10.0 |
| Zinc oxide | 2.2 |
| Sulfur | 2.5 |
| Softener | 3.5 |
| Antioxidant | 1.0 |
| Accelerator | 0.5 |
| Total | 169.7 |

EXAMPLE 2

A typical example of a rubbery composition which may be blended with a pre-cured partially refined "Butyl" composition to form a liner composition and using a rubbery butadiene-styrene copolymer (GR-S) as the elastomeric material is as follow:

| Material: | Parts by weight |
|---|---|
| Rubbery butadiene-styrene copolymer (GR-S) (72% conversion) | 100.0 |
| Carbon black | 15.0 |
| Zinc oxide | 2.0 |
| Whiting | 40.0 |
| Sulfur | 3.1 |
| Softener | 3.2 |
| Antioxidant | 0.7 |
| Accelerator | 0.6 |
| Total | 164.6 |

EXAMPLE 3

A typical example of a rubbery composition which may be blended with a pre-cured partially refined "Butyl" composition to form a liner composition and using a blend of natural rubber and a synthetic rubber as the elastomeric material is as follows:

| Material: | Parts by weight |
|---|---|
| Natural rubber | 75.0 |
| Rubbery butadiene-styrene copolymer (GR-S) (72% conversion) | 25.0 |
| Carbon black | 10.0 |
| Whiting | 45.0 |
| Zinc oxide | 2.4 |
| Sulfur | 2.9 |
| Accelerator | 0.8 |
| Softener | 3.6 |
| Antioxidant | 0.5 |
| Total | 165.2 |

EXAMPLE 4

A typical example of a rubbery composition which may be blended with the pre-cured partially refined "Butyl" composition to form a liner composition and using a chloroprene rubber as the elastomeric material is as follows:

| Material: | Parts by weight |
|---|---|
| Rubbery chloroprene-isoprene copolymer (GR-M) | 100.0 |
| Antioxidant | 2.2 |
| Carbon black | 70.0 |
| Magnesium oxide | 4.3 |
| Zinc oxide | 5.0 |
| Softener | 10.0 |
| Total | 191.5 |

These compositions may be prepared in any conventional manner, such as mixing on a roll mill or in an internal mixer.

The liner composition may be formed by blending a pre-cured partially refined "Butyl" composition homogeneously with the unvulcanized elastomeric composition in such proportions that from 50 to 80 percent by weight of the total elastomeric material in the liner composition is pre-cured partially refined "Butyl" rubber and from 20 to 50% by weight is the unvulcanized elastomeric material. To minimize the possibility of further refining the "Butyl" composition in this blending process, it is advisable to soften the unvulcanized elastomeric composition on a roll mill prior to adding the pre-cured partially refined "Butyl" composition.

It is obvious that the unvulcanized elastomeric material and accelerators, antioxidants, softeners, etc. comprising the unvulcanized rubbery composition may be blended separately with the pre-cured partially refined "Butyl" composition to form the liner composition without departing from the scope of my invention.

The portions of the tire to be vulcanized into an integral section are assembled and vulcanized in any of the usual manners; a vulcanization of 60 minutes at 280° F. in a mold being satisfactory for a pneumatic tire. After vulcanization the liner has excellent adhesion to the adjacent rubbery portion and is impermeable to air.

A liner element embodying my invention has greatly improved chafing resistance as compared to conventional "Butyl" liners. Tests were conducted on tubeless pneumatic tires comparing chafing resistance of conventional "Butyl" liners to chafing resistance of a liner embodying my invention. It was found that the conventional "Butyl" liner chafed rapidly at those portions contacting the wheel rims becoming unsatisfactory as an air-impermeable element after the tire had been driven about 5,000 miles; however, the tires embodying my invention exhibited no apparent liner wear until the tires had been driven about 20,000 miles and performed satisfactorily as an air-impermeable liner during the life of the tire tread.

A liner element embodying my invention has surprisingly excellent adhesion to the body portion of the article as compared to conventional "Butyl" liners. It is necessary to adhere the conventional "Butyl" liner to the body portion with a tie gum or cement layer to obtain appreciable adhesion, however an adhesion obtained in this manner is unsatisfactory, since the bond is relatively weak, and the assembly of the article is difficult. My liner composition adheres directly to the body portion upon vulcanizing the two members in contact with each other and has a much greater adhesion than conventional "Butyl"-tie gum bonds. Comparative adhesion tests of conventional "Butyl" liner compositions adhered to rubbery compositions with tie gums and cements and liner compositions embodying my invention were conducted using the A. S. T. M. dead weight adhesion test with the following results obtained:

*Conventional "Butyl" liner compositions*

| Adhered with cured "Butyl"-rubber tie gums: | Adhesion (#/inch width) |
|---|---|
| Tie gum A | 15 |
| Tie gum B | 13½ |
| Tie gum C | 25 |
| Tie gum D | 20 |
| Tie gum E | 17 |
| Tie gum F | 16 |
| Tie gum G | 15 |

| Adhered with uncured "Butyl"-neoprene tie gums: | |
|---|---|
| Tie gum A | 17 |
| Tie gum B | 19 |
| Tie gum C | 14 |
| Tie gum D | 12 |

| Adhered with cured "Butyl"-rubber cements: | |
|---|---|
| Cement A | 24 |
| Cement B | 13 |
| Cement C | 17 |

| Adhered with uncured "Butyl"-cement: | |
|---|---|
| Sample A | 8 |
| Sample B | 7 |

*Liner composition embodying my invention and vulcanized directly to body composition*

| | |
|---|---|
| Sample A | 51 |
| Sample B | 42 |
| Sample C | 47 |
| Sample D | 49 |
| Sample E | 52 |

The above tests were conducted using samples prepared with optimum quantities of tie gums and cements with consideration given as to the types of liner and backing material employed in selecting the tie gums and cements.

Another disadvantage of conventional "Butyl" liners is that only carbon black reinforces the rubbery material appreciably and, therefore, the liners are black in color. A liner composition embodying my invention can be reinforced sufficiently with mineral compounding ingredients and may be of any desired color.

It is obvious that minor variations and modifications may be made without departing from the scope and spirit of the invention as defined in the appended claims.

I claim:

1. A hollow article having an outer body member comprising a vulcanized polymeric organic rubbery material and having an inner air-impermeable liner member firmly adhered in direct contact to the inner surface of said body member, said liner member comprising a homogeneous vulcanized mixture of a polymeric organic rubbery material and a rubbery copolymer comprising a major proportion of an isoolefin having from four to seven carbon atoms with a minor proportion of an open-chain conjugated diolefin having from four to eight carbon atoms, said copolymer prior to being blended into said mixture having been vulcanized and subsequently partially refined until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates but possesses insufficient plasticity to form a continuous sheet of material.

2. A pneumatic tire adapted for use without an inner tube comprising a carcass including a vulcanized polymeric organic rubbery material and an inner air-impermeable liner member firmly adhered in direct contact with the inner surface of said carcass, said liner member comprising a homogeneous vulcanized mixture including a polymeric organic rubbery material and a rubbery copolymer comprising from 80 to 99½ parts by weight of isobutylene and from ½ to 20 parts by weight of isoprene, said copolymer prior to being blended into said mixture having been vulcanized and subsequently partially refined until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates which possess insufficient plasticity to form a continuous sheet of material.

3. A pneumatic tire adapted for use without an inner tube comprising a carcass including a vulcanized polymeric organic rubbery material and an inner air-impermeable liner member firmly adhered in direct contact with the inner surface of said carcass, said liner member comprising a homogeneous vulcanized mixture of 20 to 50 per cent by weight based on the total weight of elastomeric material in said mixture of a polymeric organic rubbery material and 50 to 80 per cent by weight based on the total weight of elastomeric material in said mixture of a rubbery copolymer of a major proportion of an isoolefin having from four to seven carbon atoms with a minor proportion of an open-chain conjugated diolefin having from four to eight carbon atoms, said copolymer prior to being blended into said mixture having been vulcanized and subsequently partially refined until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates which possess insufficient plasticity to form a continuous sheet of material.

4. A pneumatic tire adapted for use without an inner tube comprising rim-engaging bead portions, a carcass comprising a vulcanized polymeric organic rubbery material, and an inner air-impermeable chafe-resistant liner member extending from bead portion to bead portion about the entire inner surface of said carcass and firmly adhered directly thereto, said liner member comprising a homogeneous vulcanized mixture of 20 to 50 per cent by weight based on the total weight of elastomeric material in said mixture of a polymeric organic rubbery material and 50 to 80 per cent by weight based on the total weight of elastomeric material in said mixture of a rubbery copolymer of a major proportion of an isoolefin having from four to seven carbon atoms with a minor proportion of an open-chain conjugated diolefin having from four to eight carbon atoms, said copolymer prior to being blended into said mixture having been vulcanized and subsequently partially refined until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates which possess insufficient plasticity to form a continuous sheet of material.

5. A pneumatic tire adapted for use without an inner tube comprising a carcass including a vulcanized polymeric organic rubbery material and an inner air-impermeable liner member firmly adhered in direct contact with the inner surface of said carcass, said liner member comprising a homogeneous vulcanized mixture of the same polymeric organic rubbery material as is included in said carcass and a rubbery copolymer comprising a major proportion of an isoolefin having from four to seven carbon atoms with a minor proportion of an open-chain conjugated diolefin having from four to eight carbon atoms, said copolymer prior to being blended into said mixture having been vulcanized and subsequently partially refined until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates but possess insufficient plasticity to form a continuous sheet of material.

6. A pneumatic tire adapted for use without an inner tube comprising a carcass including a vulcanized polymeric organic rubbery material and an inner air-impermeable liner member firmly adhered in direct contact with the inner surface of said carcass, said liner member comprising a homogeneous vulcanized mixture of 20 to 50 per cent by weight based on the total weight of elastomeric material in said mixture of the same polymeric organic rubbery material as is included in said carcass and 50 to 80 per cent by weight based on the total weight of elastomeric material in said mixture of a rubbery copolymer of a major proportion of an isoolefin having from four to seven carbon atoms with a minor proportion of an open-chain conjugated diolefin having from four to eight carbon atoms, said copolymer prior to being blended into said mixture having been vulcanized and subsequently partially refined until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates which possess insufficient plasticity to form a continuous sheet of material.

7. A pneumatic tire adapted for use without an inner tube comprising rim-engaging bead portions, a carcass comprising a vulcanized polymeric organic rubbery material, and an inner air-impermeable chafe-resistant liner member extending from bead portion to bead portion about the entire inner surface of said carcass and firmly adhered directly thereto, said liner member comprising a homogeneous vulcanized mixture of 20 to 50 per cent by weight based on the total weight of elastomeric material in said mixture of the same polymeric organic rubbery material as is included in said carcass and 50 to 80 per cent by weight based on the total weight of elasto-meric material in said mixture of a rubbery copolymer of from 80 to 99½ parts by weight of isobutylene with from ½ to 20 parts by weight of isoprene, said copolymer prior to being blended into said mixture having been vulcanized and subsequently partially refined until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates which possess insufficient plasticity to form a continuous sheet of material.

8. A pneumatic tire adapted for use without an inner tube comprising a carcass including vulcanized crude rubber and an inner air-impermeable liner member firmly adhered in direct contact with the inner surface of said carcass, said liner member comprising a homogeneous vulcanized mixture of crude rubber and a rubbery copolymer comprising a major proportion of an isoolefin having from four to seven carbon atoms with a minor proportion of an open-chain conjugated diolefin having from four to eight carbon atoms, said copolymer prior to being blended into said mixture having been vulcanized and subsequently partially refined until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates but possesses insufficient plasticity to form a continuous sheet of material.

9. A pnuematic tire adapted for use without an inner tube comprising a carcass including a vulcanized rubbery butadiene-styrene copolymer and an inner air-impermeable chafe-resistant liner member firmly adhered in direct contact with the inner surface of said carcass, said liner member comprising a homogeneous vulcanized mixture of a rubbery butadiene-styrene copolymer and a rubbery copolymer comprising a major proportion of an isoolefin having from four to seven carbon atoms with a minor proportion of an open-chain conjugated diolefin having from four to eight carbon atoms, said second-mentioned copolymer in said mixture prior to being blended into said mixture having been vulcanized and subsequently partially refined until it possesses adhesive properties equivalent to the adhesive properties possessed by it when it has been vulcanized and thereafter partially refined by mechanical mastication in the absence of softeners to a condition where it begins to cohere into loose agglomerates but possesses insufficient plasticity to form a continuous sheet of material.

10. A pneumatic tire adapted for use without an inner tube comprising rim-engaging bead portions, a carcass comprising a homogeneous vulcanized blend of crude rubber and a rubbery butadiene-styrene copolymer, and an inner air-impermeable chafe-resistant liner member extending from bead portion to bead portion about the entire inner surface of said carcass and firmly adhered directly thereto, said liner member comprising a homogeneous vulcanized mixture of 20 to 50 per cent by weight based on the total weight of elastomeric material in said mixture of a polymeric organic rubbery material and 50 to 80 per cent by weight based on the total weight of elastomeric material in said mixture of a rubbery copolymer comprising from 80 to 99½ parts by weight of isobutylene and from ½ to 20 parts by weight of isoprene, said copolymer in said mixture prior to being blended into said mixture having been vulcanized and subsequently partially refined until it possesses adhesive properties equivalent to the adhesive properties possessed by it when it has been vulcanized and thereafter partially refined by mechanical mastication in the absence of softeners to a condition where it begins to cohere into loose agglomerates but possesses insufficient plasticity to form a continuous sheet of material.

11. The method of making a hollow article having an inner air-impermeable chafe-resistant liner member adhered in direct contact with the inner surface of an outer body member of a vulcanized polymeric organic rubbery material comprising providing said liner member by blending from 20 to 50 per cent by weight based on the total weight of elastomeric material in said liner member of a vulcanizable polymeric organic rubbery material homogeneously with from 50 to 80 per cent by weight based on the total weight of elastomeric material in said liner member of a rubbery copolymer of a major proportion of an isoolefin having from four to seven carbon atoms with a minor proportion of an open-chain conjugated diolefin having from four to eight carbon atoms which copolymer has been vulcanized and subsequently partially refined until the said copolymer has adhesive properties equivalent to those obtained by mechanical mastication of said copolymer in the absence of softeners until the vulcanized copolymer begins to cohere into loose agglomerates which possess insufficient plasticity to form a continuous sheet of material, providing said body member, assembling said article with said liner member in contact with the inner surface of said body member, and firmly bonding the said liner member to the said body member by vulcanizing them in contact with each other.

12. The method of making a pneumatic tire adapted for use without an inner tube and having an inner air-impermeable chafe-resistant liner member adhered in direct contact with the inner face of the carcass of said tire comprising forming a liner composition by blending a vulcanizable polymeric organic rubbery material homogeneously with a rubbery copolymer of from 80 to 99½ parts by weight of isobutylene and from ½ to 20 parts by weight of isoprene which copolymer has been vulcanized and subsequently partially refined until the said copolymer has adhesive properties equivalent to those obtained by mechanical mastication of said copolymer in the absence of softeners until the vulcanized copolymer begins to cohere into loose agglomerates which possess insufficient plasticity to form a continuous sheet, forming said liner member from said liner composition, providing said carcass which has included therein the same polymeric organic rubbery material as is included in said liner composition, assembling said tire with said liner member in contact with the inner face of said carcass, and firmly bonding said liner member to said carcass by vulcanizing them in contact with each other.

13. A hollow article having an outer body member comprising a vulcanized polymeric organic rubbery material and having an inner air-impermeable liner member firmly adhered directly to the inner surface of said body member, said liner member comprising a homogeneous vulcanized mixture of a polymeric organic rubbery material and a rubbery copolymer comprising a major proportion of an isoolefin having from four to seven carbon atoms with a minor proportion of an open-chain conjugated diolefin having from four to eight carbon atoms, said copolymer having been vulcanized and subsequently partially refined prior to being blended into said mixture.

14. A pneumatic tire adapted for use without an inner tube comprising a carcass including a vulcanized polymeric organic rubbery material and an inner air-impermeable chafe-resistant liner member firmly adhered in direct contact with the inner surface of said carcass, said liner member comprising a homogeneous mixture of a polymeric organic rubbery material and a rubbery copolymer comprising a major proportion of an isoolefin having from four to seven carbon atoms with a minor proportion of an open-chain conjugated diolefin having from four to eight carbon atoms, said copolymer having been vulcanized and subsequently partially refined by mechanical mastication prior to being blended into said mixture.

15. A pneumatic tire adapted for use without an inner tube comprising a carcass including a vulcanized polymeric organic rubbery material and an inner air-impermeable chafe-resistant liner member firmly adhered in direct contact with the inner surface of said carcass, said liner member comprising a homogeneous vulcanized mixture of a polymeric organic rubbery material and a rubbery copolymer comprising a major proportion of an isoolefin having from four to seven carbon atoms with a minor proportion of an open-chain conjugated diolefin having from four to eight corbon atoms, said copolymer having been vulcanized and subsequently partially refined by heat degradation prior to being blended into said mixture.

16. A pneumatic tire adapted for use without an inner tube comprising a carcass including a vulcanized polymeric organic rubbery material and an inner air-impermeable chafe-resistant liner member firmly adhered in direct contact with the inner surface of said carcass, said liner member comprising a homogeneous vulcanized mixture of a polymeric organic rubbery material and a rubbery copolymer comprising a major proportion of an isoolefin having from four to seven carbon atoms with a minor proportion of an open-chain conjugated diolefin having from four to eight carbon atoms, said copolymer prior to being blended into said mixture having been vulcanized and subsequently partially refined by heat degradation until it possesses adhesive properties equivalent to the adhesive properties possessed by said copolymer when the said copolymer has been vulcanized and thereafter partially refined by mechanical mastication in the absence of softeners to a condition where the vulcanized copolymer begins to cohere into loose agglomerates but possesses insufficient plasticity to form a continuous sheet of material.

17. The method of making a pneumatic tire adapted for use without an inner tube and having a carcass and an inner air-impermeable chafe-resistant liner member adhered in direct contact with the inner face of said carcass comprising forming a liner composition by blending a vulcanizable polymeric organic rubbery material homogeneously with a rubbery copolymer comprising a major proportion of an isoolefin having from four to seven carbon atoms with a minor proportion of an open-chain conjugated diolefin having from four to eight carbon atoms which copolymer has been vulcanized and thereafter partially refined, forming said liner member from said liner composition, providing said carcass, assembling said tire with said liner member in contact with the inner face of said carcass, and firmly bonding said liner member directly to the inner face of said carcass by vulcanizing them in contact with each other.

18. The method of making a pneumatic tire adapted for use without an inner tube and having a carcass and an inner air-impermeable chafe-resistant liner member adhered in direct contact with the inner face of said carcass comprising forming a liner composition by blending a vulcanizable polymeric organic rubbery material homogeneously with a rubbery copolymer comprising a major proportion of an isoolefin having from four to seven carbon atoms with a minor proportion of an open-chain conjugated diolefin having from four to eight carbon atoms which copolymer has been vulcanized and thereafter partially refined by heat degradation, forming said liner member from said liner composition, providing said carcass, assembling said tire with said liner member in contact with the inner face of said carcass, and firmly bonding said liner member directly to the inner face of said carcass by vulcanizing them in contact with each other.

19. The method of making a pneumatic tire adapted for use without an inner tube and having a carcass and an inner air-impermeable chafe-resistant liner member adhered in direct contact with the inner face of said carcass comprising forming a liner composition by blending a vulcanizable polymeric organic rubbery material homogeneously with a rubbery copolymer comprising a major proportion of an isoolefin having from four to seven carbon atoms with a minor proportion of an open-chain conjugated diolefin having from four to eight carbon atoms which copolymer has been vulcanized and thereafter partially refined by heat degradation until the said copolymer has adhesive properties equivalent to those obtained by mechanical mastication of said copolymer in the absence of softeners until the vulcanized copolymer begins to cohere into loose agglomerates which possess insufficient plasticity to form a continuous sheet, forming said liner member from said liner composition, providing said carcass, assembling said tire with said liner member in contact with the inner face of said carcass, and firmly bonding said liner member directly to the inner face of said carcass by vulcanizing them in contact with each other.

References Cited in the file of this patent

UNITED STATES PATENTS

| Number | Name | Date |
| --- | --- | --- |
| 1,138,911 | Thomas | May 11, 1915 |
| 1,407,401 | Freeman et al. | Feb. 21, 1922 |
| 1,650,107 | Auger | Nov. 22, 1927 |
| 1,903,575 | Shoemaker | Apr. 11, 1933 |
| 2,194,341 | Voorhees | Mar. 19, 1940 |
| 2,392,590 | Hulswit et al. | Jan. 8, 1946 |
| 2,395,071 | Sarbach | Feb. 19, 1946 |
| 2,467,322 | Lightbown et al. | Apr. 12, 1949 |
| 2,499,724 | Compton | Mar. 7, 1950 |
| 2,541,550 | Sarbach et al. | Feb. 13, 1951 |
| 2,566,329 | Hessney et al. | Sept. 4, 1951 |
| 2,583,387 | Morrissey et al. | Jan. 22, 1952 |
| 2,587,470 | Herzegh | Feb. 26, 1952 |

FOREIGN PATENTS

| Number | Country | Date |
| --- | --- | --- |
| 42,198 | Denmark | Apr. 29, 1930 |